United States Patent
Ishii et al.

(10) Patent No.: US 7,873,599 B2
(45) Date of Patent: Jan. 18, 2011

(54) BACKUP CONTROL APPARATUS AND METHOD ELIMINATING DUPLICATION OF INFORMATION RESOURCES

(75) Inventors: Yohsuke Ishii, Yokohama (JP); Takaki Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 11/522,362

(22) Filed: Sep. 18, 2006

(65) Prior Publication Data

US 2008/0028007 A1 Jan. 31, 2008

(30) Foreign Application Priority Data

Jul. 27, 2006 (JP) .............................. 2006-204688

(51) Int. Cl.
*G06F 19/00* (2006.01)
(52) U.S. Cl. .................... 707/640; 707/655; 707/661
(58) Field of Classification Search ................ 707/640, 707/655, 661
See application file for complete search history.

(56) References Cited

U.S. PATENT DOCUMENTS

| | | | |
|---|---|---|---|
| 5,276,867 A * | 1/1994 | Kenley et al. ............... | 707/204 |
| 5,317,728 A * | 5/1994 | Tevis et al. .................. | 707/204 |
| 5,765,173 A * | 6/1998 | Cane et al. ................... | 707/204 |
| 5,778,390 A * | 7/1998 | Nelson et al. ............... | 707/204 |
| 5,991,753 A * | 11/1999 | Wilde ............................ | 707/2 |
| 6,023,709 A * | 2/2000 | Anglin et al. ............... | 707/204 |
| 6,026,414 A | 2/2000 | Anglin et al. | |
| 6,195,650 B1 * | 2/2001 | Gaither et al. ................. | 707/1 |
| 6,279,011 B1 * | 8/2001 | Muhlestein ................. | 707/204 |
| 6,282,610 B1 * | 8/2001 | Bergsten ...................... | 711/114 |
| 6,389,433 B1 * | 5/2002 | Bolosky et al. ............. | 707/205 |
| 6,513,051 B1 * | 1/2003 | Bolosky et al. ............. | 707/204 |
| 7,266,574 B1 * | 9/2007 | Boudrie et al. ............... | 707/204 |
| 2002/0056031 A1 * | 5/2002 | Skiba et al. .................. | 711/162 |
| 2002/0107877 A1 * | 8/2002 | Whiting et al. ............. | 707/204 |
| 2003/0065898 A1 * | 4/2003 | Flamma et al. ............. | 711/165 |
| 2004/0093361 A1 * | 5/2004 | Therrien et al. ............. | 707/204 |
| 2004/0210608 A1 * | 10/2004 | Lee et al. ...................... | 707/204 |
| 2005/0086241 A1 * | 4/2005 | Ram et al. ................... | 707/100 |
| 2006/0053181 A1 * | 3/2006 | Anand et al. ................. | 707/204 |
| 2006/0075005 A1 * | 4/2006 | Kano et al. .................. | 707/204 |

(Continued)

OTHER PUBLICATIONS

"Network Data Management Protocol" by Stager, H., Internet Draft. <draft-stager-iguard-netapp-backup-05.txt>. Sep. 1997.

*Primary Examiner*—Charles Kim
*Assistant Examiner*—Kurt Mueller
(74) *Attorney, Agent, or Firm*—Brundidge & Stanger, P.C.

(57) ABSTRACT

A backup control apparatus which references duplication management information which includes first stored location information indicating the stored location of first information resource and second stored location information indicating the stored location of a second information resource which duplicates the first information resource, and identifies, from among a plurality of information resources belonging to a backup region. The first information resource stored in the location indicated by the first stored location information, and a second information resource stored in the location indicated by the second stored location information corresponding to the first stored location information. The backup control apparatus replaces the identified second information resource with linked information indicating a link to the identified first information resource, and backs up the backup region in which the second information resource is replaced with the linked information.

12 Claims, 15 Drawing Sheets

U.S. PATENT DOCUMENTS

2007/0130230 A1* 6/2007 Naineni et al. .............. 707/204
2007/0198611 A1* 8/2007 Prahlad et al. .............. 707/204
2008/0201366 A1* 8/2008 Devarakonda et al. ... 707/103 Y

* cited by examiner

REPLICATION CONFIGURATION INFORMATION TABLE

| ORIGINAL FILE | CLONE FILE |
|---|---|
| /dirB/f2 | /dirA/f3 |
| /dirA/f4 | /dirB/f5 |
| /dirB/f5 | /dirB/f6 |

~127

REPLICATION CONFIGURATION
INFORMATION TABLE

| ORIGINAL FILE | CLONE FILE |
|---|---|
| FS210:/dirA/f2 | FS220:/dirB/f3 |
| FS220:/dirA/f4 | FS210:/dirB/f5 |
| FS220:/dirA/f4 | FS220:/dirB/f6 |

~127

BACKUP CONTROL APPARATUS AND METHOD ELIMINATING DUPLICATION OF INFORMATION RESOURCES

CROSS-REFERENCE TO PRIOR APPLICATION

This application relates to and claims priority from Japanese Patent Application No. 2006-204688, filed on Jul. 27, 2006, the entire disclosure of which is incorporated herein by reference.

BACKGROUND

This invention relates to control of backups of information resources stored in a computer system.

In recent years, the improved performance and lower costs of computer systems have expanded use of computer systems in a variety of industries and applications. This has been accompanied by conversion into electronic form of information resources which had conventionally been handled using paper, so that information has come to be stored electronically in computer systems. Further, with rapid advances in the utilization of computer systems, the volume of information resources stored in computer systems has been increasing. As a result, backup technology to protect valuable information resources from disasters, errors in operations and similar has become increasingly important.

In the prior art, when backing up information resources, technology to efficiently execute backups in order to reduce the impact on actual operation has been regarded as important. For example, NDMP (Network Data Management Protocol) has been stipulated as a protocol to execute backup processing between backup servers which control backup processing and data servers which manage the data of the backup target, and has been disclosed (NDMP Protocol version 3

(ftp://ftp.ndmp.org/pub/version.3/doc/ndmp_draft_v3_0.pdf).

Faster speeds and lower costs of network systems, constructed by connecting a plurality of computer systems in a network, have lead to construction and utilization of numerous such the network systems. In such an environment, the importance of backup of information resources is same. In particular, the ability to efficiently backup information resources stored in a plurality of computer systems in a batch is important in order to reduce the impact on actual operation. For example, backup technology has been disclosed, for an environment in which a plurality of computer systems are integrated in a single name space, transparently enabling accessing of information resources without making the user conscious of differences between computer systems, which efficiently backs up information resources stored in computer systems comprised by the name space (U.S. Pat. No. 6,026,414).

SUMMARY

However, in the case of the technology described in NDMP Protocol version 3, there is no concern whatsoever with the quantity of information resources stored in the computer system, and the specified quantity is backup up without further processing. Consequently when there exist a plurality of information resources having the same contents in the backup source due to information resource replication or other reasons, a plurality of information resources with the same contents are stored in the backup destination. As a result, there is the problem that the backup quantity (the total information size of the one or plurality of information resources of the backup target) is increased.

Further, when there exist a plurality of information resources having the same contents due to replication of information resources between a plurality of computer systems or for other reasons, similarly to the technology described in U.S. Pat. No. 6,026,414, a plurality of information resources having the same contents are stored in the backup destination. As a result, there is the problem that the backup quantity is increased.

Hence an object of this invention is to reduce the backup quantity.

A backup control apparatus according to this invention comprises a duplication management unit, a duplication identification unit, an information replacement control unit, and a backup unit. The duplication management unit stores duplication management information comprising first stored location information indicating the location in which a first information resource is stored, and second stored location information indicating the location in which a second information resource, which duplicates the first information resource, is stored. The duplication identification unit identifies the first information resource stored in the location indicated by the first stored location information and the second information resource stored in the location indicated by the second stored location information corresponding to the first stored location information, among a plurality of information resources belonging to a backup region. The information replacement control unit replaces the identified second information resource with linked information indicating a link to the identified first information resource. The backup unit backs up the backup region in which the second information resource is replaced with the linked information.

This backup control apparatus can be constructed from for example a file server, described below, or from the combination of a file server and backup server. Information resources are defined as resources in which information is recorded, such as for example files and/or directories.

Stored location information managed in the duplication management information may be information indicating physical locations, or may be information indicating logical locations, or may be information indicating a combination of both kinds of locations. No restrictions are placed on the types or units of stored location information managed in the duplication management information. For example, when targeting a file system which manages information resources in file units, file units can be used. Or, a plurality of files may for example be bundled as a directory unit, or a plurality of directories and files may be bundled as a file system unit, to manage replication configuration information. When targeting a system which handles information in fixed length units, as in a database or similar, fixed block units or a plurality of blocks may be bundled in volume units to manage replication configuration information.

In a first mode, the first information resource is a replication source information resource, and the second information resource is a replication destination information resource, generated by replication of the replication source information resource.

In a second mode, the backup control apparatus of the first mode further comprises a replication unit which stores another information resource by replicating a certain information resource, and a duplication management appending unit, which appends to the duplication management information first stored location information indicating the location in which the certain information resource is stored, and second stored location information indicating the location in which the other information resource is stored.

In a third mode, the backup control apparatus further comprises an information resource updating unit which updates information resources, and a duplication management information deletion unit which, when the stored location information indicating the stored location of an updated information resource is included in the duplication management information, deletes the stored location information, and stored location information corresponding to the stored location from the duplication management information.

In a fourth mode, the backup control apparatus further comprises an information resource migrating unit, which alters the stored location of an information resource to another stored location, and a duplication management information alteration unit which, when pre-alteration location information indicating the stored location before alteration is included in the duplication management information, alters the pre-alteration location information to information indicating the other stored location.

In a fifth mode, the backup control apparatus comprises an information resource migrating unit and a duplication management information deletion unit. The information resource migrating unit alters the stored location of an information resource to another stored location. When information indicating the other stored location is included in the duplication management information, the duplication management information deletion unit deletes this information, and stored location information corresponding to this information, from the duplication management information.

In a sixth mode, the information resources are directories and/or files managed by a file system.

In a seventh mode, the linked information comprises symbolic link information, constituted by a relative path name to the first information resource, taking the second information resource as a base point.

In an eighth mode, a plurality of information resources belonging to the backup target are a portion of numerous information resources. The information replacement control unit judges whether a first information resource which duplicates the second information resource belongs to the backup target, and when the first information resource does not belong to the backup target, does not replace the second information resource with the linked information. The backup unit backs up the backup region, comprising the second information resource not replaced with the linked information.

In a ninth mode, the first information resource is a replication source file, and the second information resource is a replication destination file generated by replicating the replication source file. The linked information is a symbolic link file constituted by a relative path name to the first file, with the second file as a base point. A plurality of information resources belonging to the backup target are a portion of numerous information resources. The backup control apparatus further comprises a replication unit, which stores another file by replicating a certain file; a duplication management information appending unit, which appends to the duplication management information first stored location information indicating the location in which the certain file is stored and second stored location information indicating the location in which the other file is stored; an information resource updating unit which updates files; and a duplication management information deletion unit which, when stored location information indicating the stored location of an updated file is included in the duplication management information, deletes the stored location information and the stored location information corresponding to the stored location from the duplication management information. The information replacement control unit judges whether the first file, which duplicates the second file, belongs to the backup target, and when the first information resource does not belong to the backup target, does not replace the second file with the symbolic link file. The backup unit backs up the backup region, comprising the second file which is not replaced by the symbolic link file.

In a control apparatus system of this invention, each of a plurality of backup control apparatuses comprises an information resource management unit, which manages a plurality of information resources, and a backup unit, which backs up two or more information resources belonging to a backup region among a plurality of information resources managed by itself and/or other backup control apparatuses among the plurality of backup control apparatuses. At least one of the plurality of backup control apparatuses comprises a duplication management unit, which stores duplication management information comprising first stored location information indicating the location in which a first information resource managed by the apparatus itself is stored and second stored location information indicating the location in which a second information resource, which duplicates the first information resource, is stored; a duplication identification unit, which identifies, among two or more information resources belonging to a backup region, the first information resource stored in the location indicated by the first stored location information and the second information resource stored in the location indicated by the second stored location information corresponding to the first stored location information; and an information replacement control unit, which replaces the identified second information resource with linked information indicating linking to the identified first information resource. The backup unit of the one or more backup control apparatuses backs up the backup region in which the second information resource is replaced with the linked information.

In a first mode, other backup control apparatuses other than the one or more backup control apparatus among the plurality of backup control apparatuses comprise a prescribed processing execution unit, which executes prescribed processing to replicate, update, or migrate any of the plurality of information resources managed by the apparatus, and a notification unit, which notifies the one or more backup control apparatuses of information relating to the prescribed processing when the prescribed processing is executed. In this case, the one or more backup control apparatuses comprise a reception unit, which receives information relating to the prescribed processing, and a duplication management information updating unit, which updates the duplication management information using the received information.

In a second mode, when in the first mode the prescribed processing is replication, the information relating to the prescribed processing comprises first stored location information indicating the location in which the replication source information resource is stored, and second stored location information indicating the location in which the replication destination information resource is stored. The duplication management information updating unit appends the received first stored location information and second stored location information to the duplication management information.

In a third mode, when in the first mode the prescribed processing is updating, the information relating to the prescribed processing comprises stored location information indicating the location in which the updated information resource is stored. The duplication management information updating unit deletes the received stored location information, and the stored location information corresponding thereto, from the duplication management information.

In a fourth mode, when in the first mode the prescribed processing is migration, the information relating to the prescribed processing comprises first stored location information indicating the location in which the migration source information resource is stored, and second stored location information indicating the location in which the migration destination information resource is stored. The duplication management information updating unit alters the stored location information in the duplication management information matching the received first stored location information to the received second stored location information.

In a fifth mode, the one or more backup control apparatuses are all of the plurality of backup control apparatuses. Each backup control apparatus further comprises a prescribed processing execution unit, which executes prescribed processing to replicate, update or migrate any of a plurality of information resources which the apparatus itself manages; a notification unit, which, when the prescribed processing has been executed, notifies backup control apparatuses other than itself among the plurality of backup control apparatuses, of information relating to the prescribed processing; a reception unit, which receives information relating to the prescribed processing; and a duplication management information updating unit, which updates the duplication management information using the received information.

Each of the above-described units can be realized either in hardware (for example as circuits), or as a computer program, or as a combination of these (for example, with a portion executed in hardware, and the rest executed by one or a plurality of CPUs which read and execute a computer program). Each computer program can be read from a storage resource (for example, memory) comprised by a computer machine. The storage resource can be installed via CD-ROMs, DVDs (Digital Versatile Disks) or other recording media, or can be downloaded via the Internet, a LAN, or another communication network. A computer program to realize the above-described control apparatuses, and recording media on which the program is recorded, can be realized in various modes such as data signals embodied in carrier waves comprising the program. As recording media, various volatile and nonvolatile storage media readable by a computer, such as flexible disks, CD-ROMs, DVD-ROMs, punch cards, printed matter on which are printed bar codes or other symbols, internal and external storage devices of computers, and similar, can be used.

DESCRIPTION OF THE PREFERRED EMBODIMENTS

Figure 1:
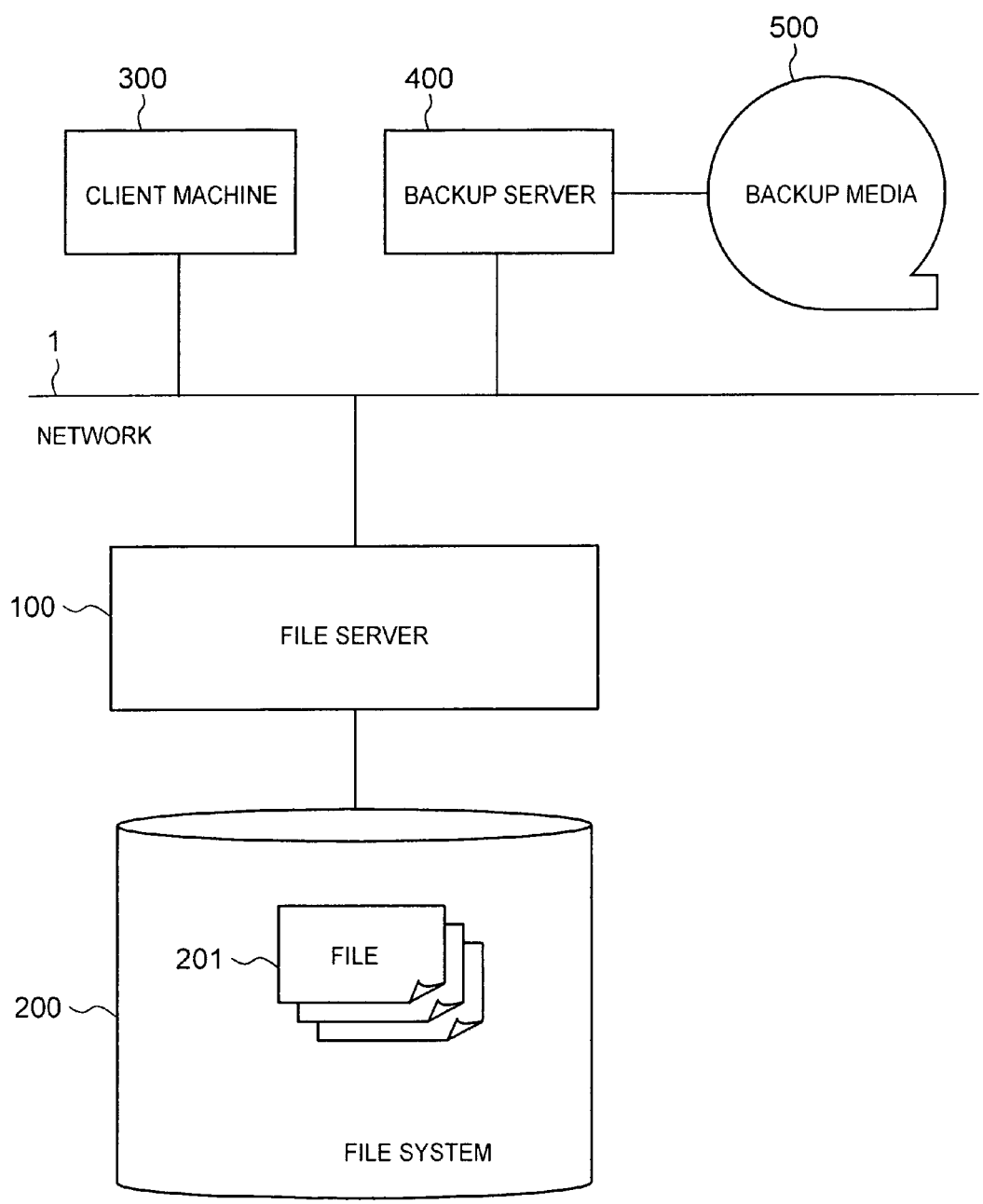
FIG. 1 shows the system configuration of Embodiment 1.

Below, a number of embodiments of the invention are explained, referring to the drawings.

Embodiment 1

FIG. 1 is an explanatory diagram showing an example of the system configuration in Embodiment 1 of the invention.

The file server 100, which provides file services, has a file system 200. The file system 200 has an interface for functions to manage and access the files 201 therein. One file system 200 may be used to manage a portion of or the entirety of one logical volume, or may be used to manage a plurality of logical volumes.

The file server 100 can be connected to the client machine 300 via the network 1. The client machine 300 communicates with the file server 100 and can access the file system 200 of the file server 100.

The network 1 can be connected to the backup server 400. The backup server 400 communicates with the file server 100, and can request backup creation for file groups in the file system 200 and can retrieve backup data sets (file groups for backup targets) via the file server 100. The backup server 400 stores retrieved backup data in backup media 500 connected to the backup server 400. The backup server 400 can request to restore file groups of the file system 200 by the file server 100 based on backup data. The backup media 500 can for example be tape media. In place of this, other recording media, such as for example flexible disks, CD-ROMS, DVD-ROMs, punch cards, printed matter on which are printed bar codes or other symbols, internal and external storage devices of computers, and various other volatile and nonvolatile recording media readable by computers can be used.

Figure 2:
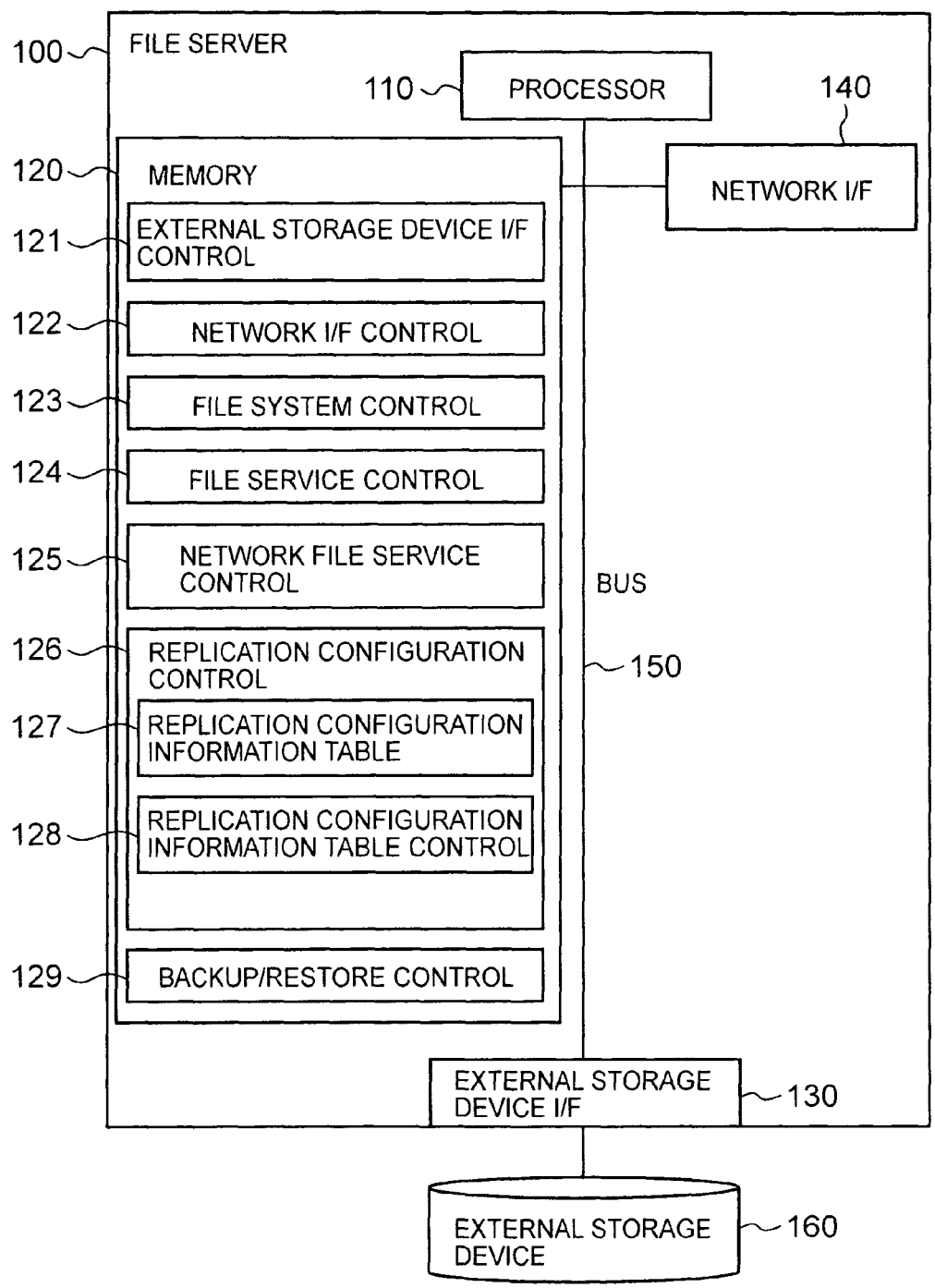
FIG. 2 shows the hardware configuration of the file server in Embodiment 1.

FIG. 2 is an explanatory diagram showing an example of the hardware configuration of the file server 100.

The file server 100 comprises a processor 110, which executes programs; memory 120, which temporarily stores programs and data; an external storage device I/F 130, to access the external storage device 160; a network I/F 140, to access other apparatuses connected to the network 1; and a bus 150 connecting these.

The memory 120 stores external storage device I/F control 121, which is a program to control the external storage device I/F 130; network I/F control 122, which is a program to control the network I/F 140; and file system control 123, which is a program to control the file system. The memory 120 also stores file service control 124, which is a program to control services enabling a user to use functions of the file system control 123, and network file service control 125, which is a program to control services enabling a user to use functions of the file system control 123 via the network. Further, the memory 120 stores replication configuration control 126, which is a program to control data replication configuration information, and backup/restore control 129, which is a program to control data backup and restore processing. The replication configuration control 126 is a program comprising a replication configuration information table 127 to manage replication configuration information, and replication configuration information table control 128 to access the replication configuration information table. One or more of the above plurality of computer programs can be incorporated in the operating system (OS), not shown, of the file server 100.

Figure 3:
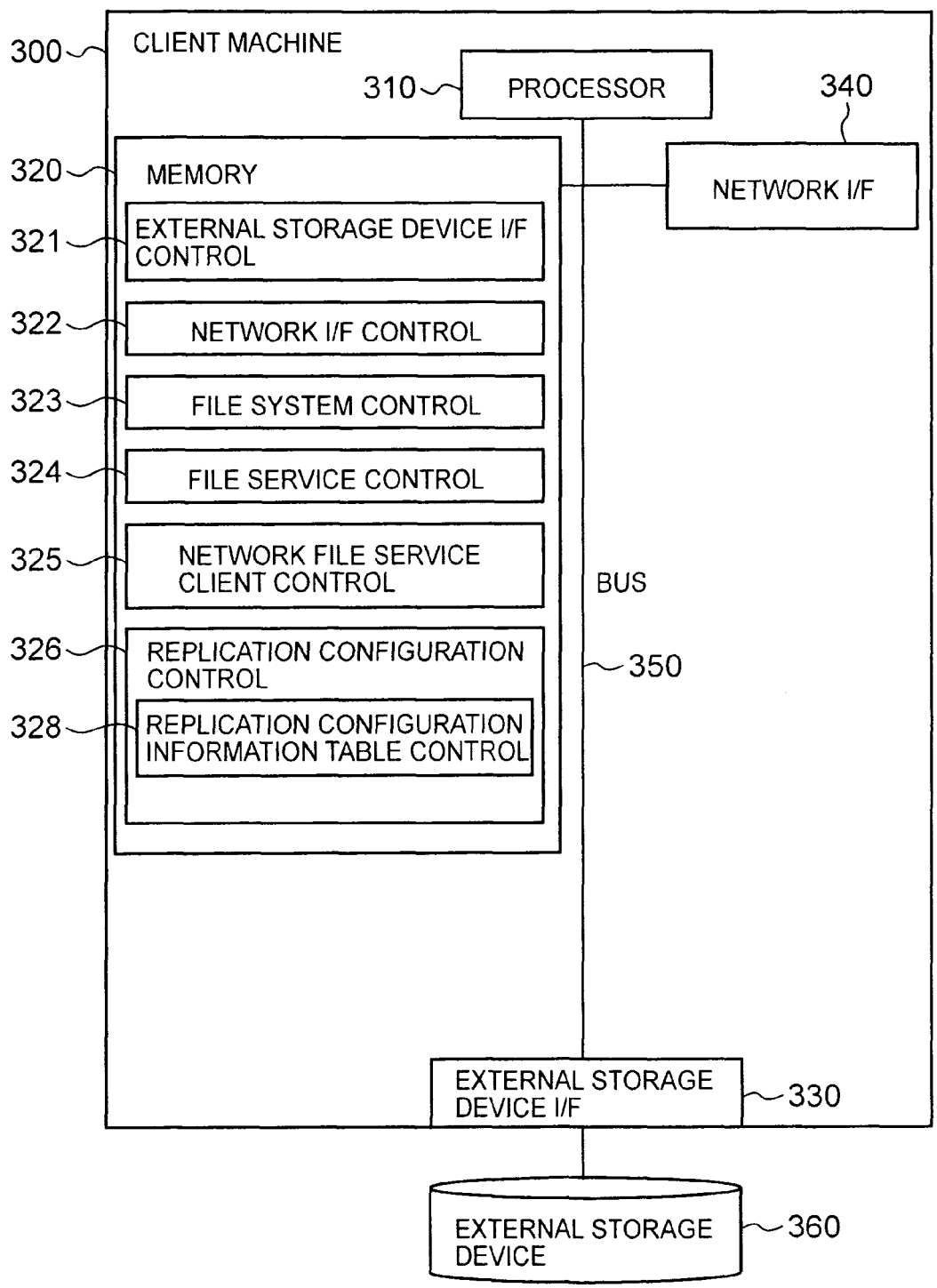
FIG. 3 shows the hardware configuration of the client machine in Embodiment 1.

FIG. 3 is an explanatory diagram showing an example of the hardware configuration of the client machine 300.

The client machine 300 comprises a processor 310, which executes programs; memory 320, which temporarily stores programs and data; an external storage device I/F 330, to access the external storage device 360; a network I/F 340, to access other apparatuses connected to the network; and a bus 350 which connects these.

In memory 320 are stored external storage device I/F control 321, which is a program to control the external storage device I/F 330; network I/F control 322, which is a program to control the network I/F 340; and file system control 323, which is a program to control the file system of the client machine. In memory 320 are also stored file service control 324, which is a program to control services enabling a user to use functions of the file system control 323 of the client machine; network file service client control 325, which is a program to control client-side services enabling a user to use, via the network, functions of the network file service control 125 provided by the file server 200; and replication configuration control 326, which is a program to control data replication configuration information. The replication configuration control 326 is a program comprising replication configuration information table control 328 to access the replication configuration information table 127 on the file server 100. One or more of the above plurality of computer programs can be incorporated in the operating system (OS), not shown, of the client machine 300.

Figure 4:
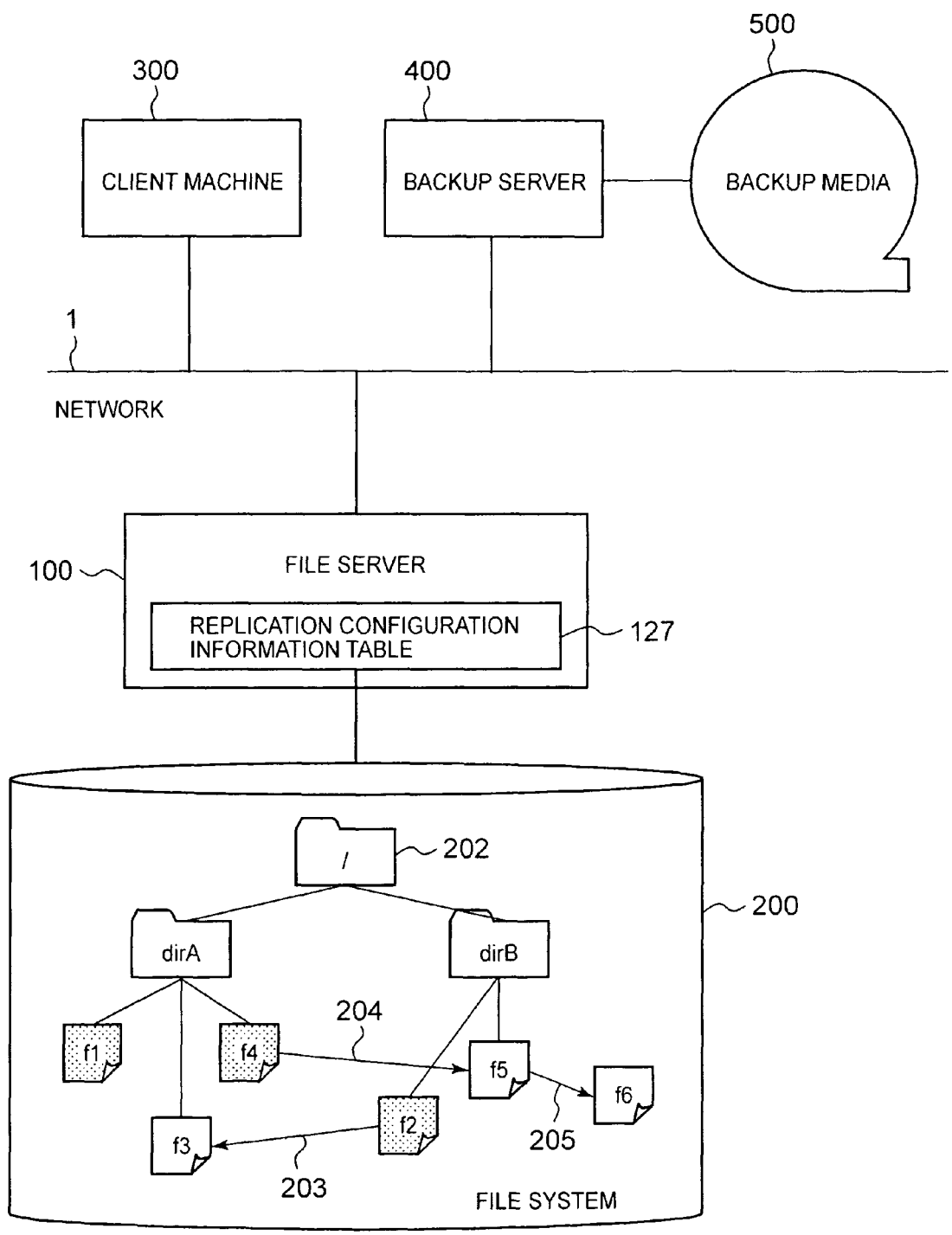
FIG. 4 shows the system configuration during file system operation in Embodiment 1.

FIG. 4 is a system configuration diagram at the time the file server 100 uses the file system 200 to provide file services.

In the file system 200, data is managed in a hierarchical structure at the apex of which is, for example, the root directory ("/") 202 of the file system. In the example of FIG. 4, two directories, dirA and dirB, exist below the root directory 202. Below the directory dirA exist three files, f1, f3 and f4. Below the directory dirB exist three files, f2, f5 and f6.

The arrows 203, 204 and 205 in FIG. 4 represent replication of files in the file system 200 utilizing functions of the file service control 124 provided by the file server 100. Here, a file which is a replication source is called an "original file", and a file created through replication is called a "clone file". The arrow 203 indicates replication of the original file f2 to create the clone file f3. Similarly, the arrow 204 indicates replication of the original file f4 to create the clone file f5. The arrow 205 indicates further replication of this file f5 to create the clone file f6 (in this replication, f5 is the original file).

The file server 100 manages the file system 200, and has a replication configuration information table 127 to manage the replication configuration of files stored in the file system 200 (the configuration indicating which files are original files and which files are clone files in replications).

Figures 5, 6:
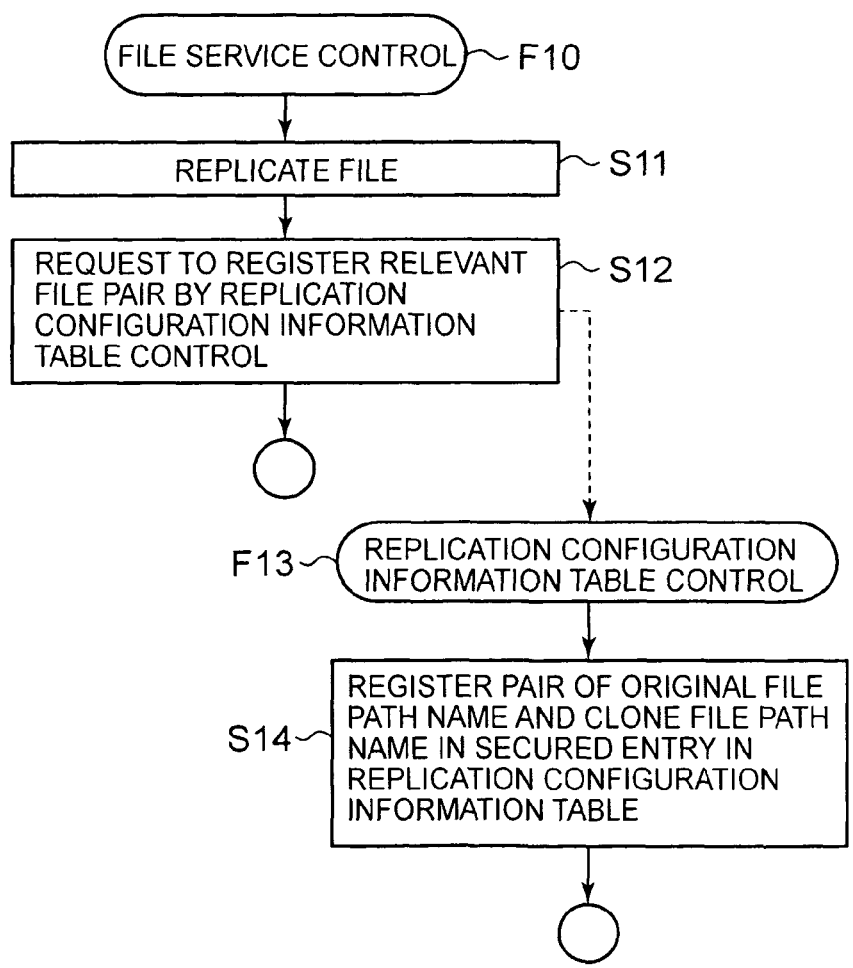
FIG. 5 is an explanatory diagram showing an example of a replication configuration information table in Embodiment 1.
FIG. 6 is a flowchart explaining processing for registration in the replication configuration information table during file replication in Embodiment 1.

FIG. 5 shows an example of the configuration of a replication configuration information table 127.

The replication configuration information table 127 manages the correspondence relation between an original file and a clone file in the file system 200 managed by the file server 100 as a single entry. Here, as the correspondence relation, the stored locations of both files in the file system 200 are managed. In FIG. 5, the file path names in the file system 200 are managed as stored locations. As a file path name, the absolute path name from the root directory of the file system is used. For example, in the correspondence relation between original file f2 and clone file f3 in FIG. 5, "/dirB/fs2" as the stored location of the original file, and "/dirA/fs3" as the stored location of the clone file, are managed as a single entry. However, the format of file stored locations managed in the replication configuration information table 127 is not limited to this. Any method may be used which enables unique identification of the target file.

Various occasions for updating this replication configuration information table 127 are conceivable; in this Embodiment 1, there are three occasions, which are specifically file replication and creation, file updating, and file migration. Below, the flow of processing to update the replication configuration information table 127 upon each of these occasions is explained.

FIG. 6 shows the flow of processing to append an entry to the replication configuration information table 127 at the time of file replication. The processing flow F10 indicates the flow of file replication processing in file service control 124 of the file server 100.

First, replication of the target file (for example, a file specified by the user) is performed (step S11). Specifically, for example, the file service control 124 issues a request to the file system control 123 for acquisition of the contents of the original file and creation of a clone file based on these contents. In this request, for example, the absolute path name of the replication destination of the clone file is specified. The file system control 123 reads the target file, and by writing the target file to the location having the specified absolute path name, can generate the clone file.

Next, the file service control 124 issues a request to the replication configuration information table control 128 for registration of the file pair (step S12). In this processing, information on the path names of the original file and the clone file is provided to the replication configuration information table control 128. The specific flow of processing is indicated by the processing flow F13 in FIG. 6.

The processing flow F13 represents the flow of processing in the replication configuration information table control 128 to append an entry to the replication configuration information table. Here, the replication configuration information table control 128 secures one new entry in the replication configuration information table 127, and registers the provided path name information for the original file and clone file in the entry (step S14).

Control to execute the processing flow F10 is not limited to file service control 124. Processing may be performed by the network file service control 125 of the file server 100, or by the network file service client control 325 of the client machine 300.

Figure 7:
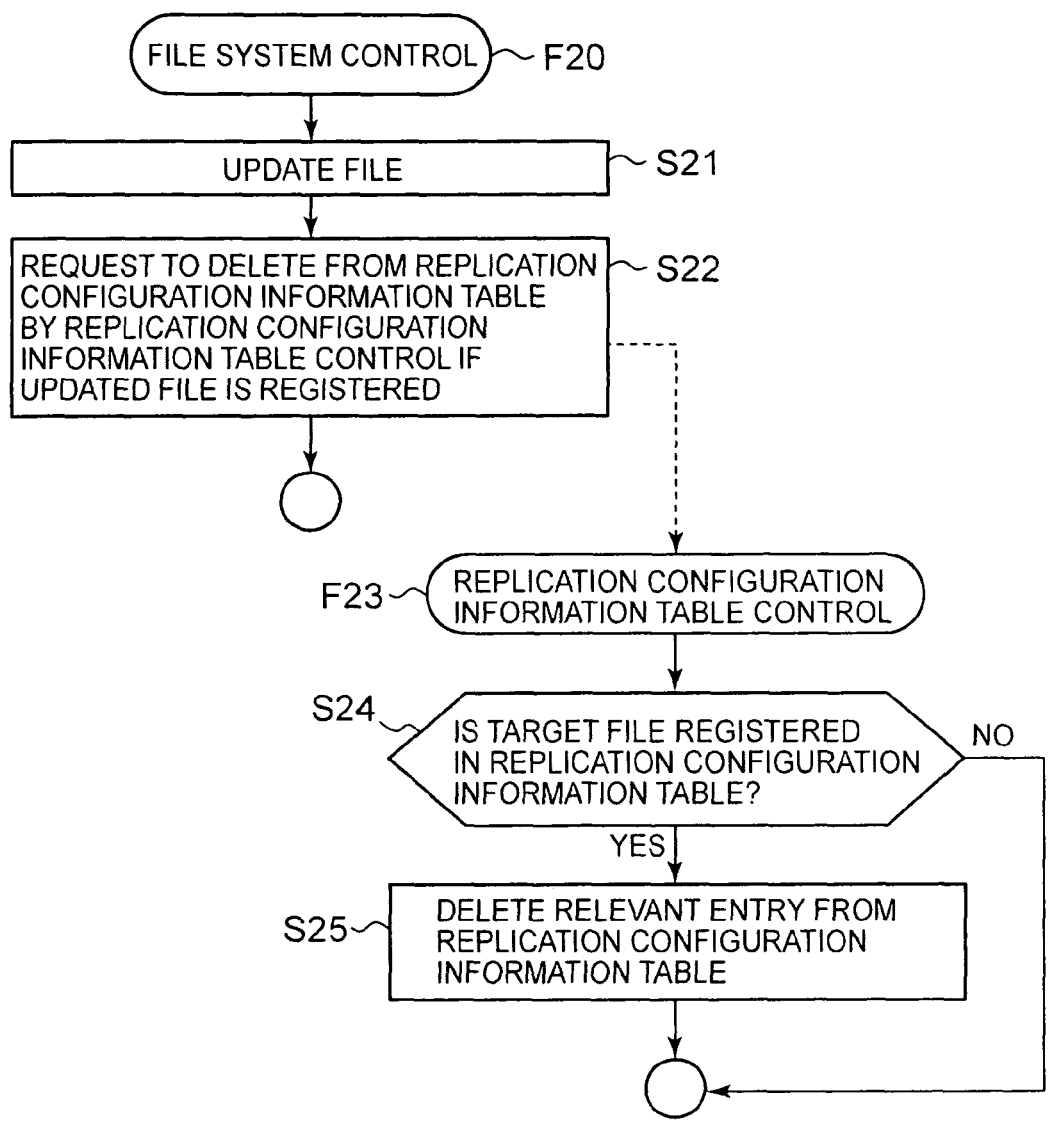
FIG. 7 is a flowchart explaining processing for deletion from the replication configuration information table during file updating in Embodiment 1.

FIG. 7 shows the flow of processing to delete an entry in the replication configuration information table 127 at the time of file updating.

The reason for deletion of the entry in the replication configuration information table 127 upon file updating is that, when either the original file or the clone file is updated, the contents of the two files differ. The processing flow F20 represents the flow of update processing in the file service control 124 of the file server 100.

First, updating of the target file is performed (step S21). Specifically, for example, the file service control 124 issues a request to the file system control 123 to update the target file. By this means, the target file is updated by the file system control 123.

Next, the file service control 124 issues a request to the replication configuration information table control 128 to delete the entry (the entry containing the path name) if the target file which has been updated (hereafter the "updated file") is a file the path name of which is registered in the replication configuration information table 127 (step S22). In this processing, the file service control 124 provides the path name of the updated file to the replication configuration information table control 128. The specific flow of processing is represented by the processing flow F23 in FIG. 7.

The processing flow F23 represents the flow of processing in the replication configuration information table control 128 to delete the entry in the replication configuration information table 127.

First, the replication configuration information table control 128 checks whether the path name of the updated file, received from the file service control 124, is registered in the replication configuration information table 127 as an original file or as a clone file (step S24). If the path name of the updated file is registered, the replication configuration information table control 128 deletes the entry from the replication configuration information table 127 (step S25). If on the other hand the path name of the updated file is not registered, the replication configuration information table control 128 ends processing.

The control which executes the processing flow F20 is not limited to the file service control 124. The processing may be performed by the network file service control 125 of the file server 100, or by the network file service client control 325 of the client machine 300.

Figure 8:
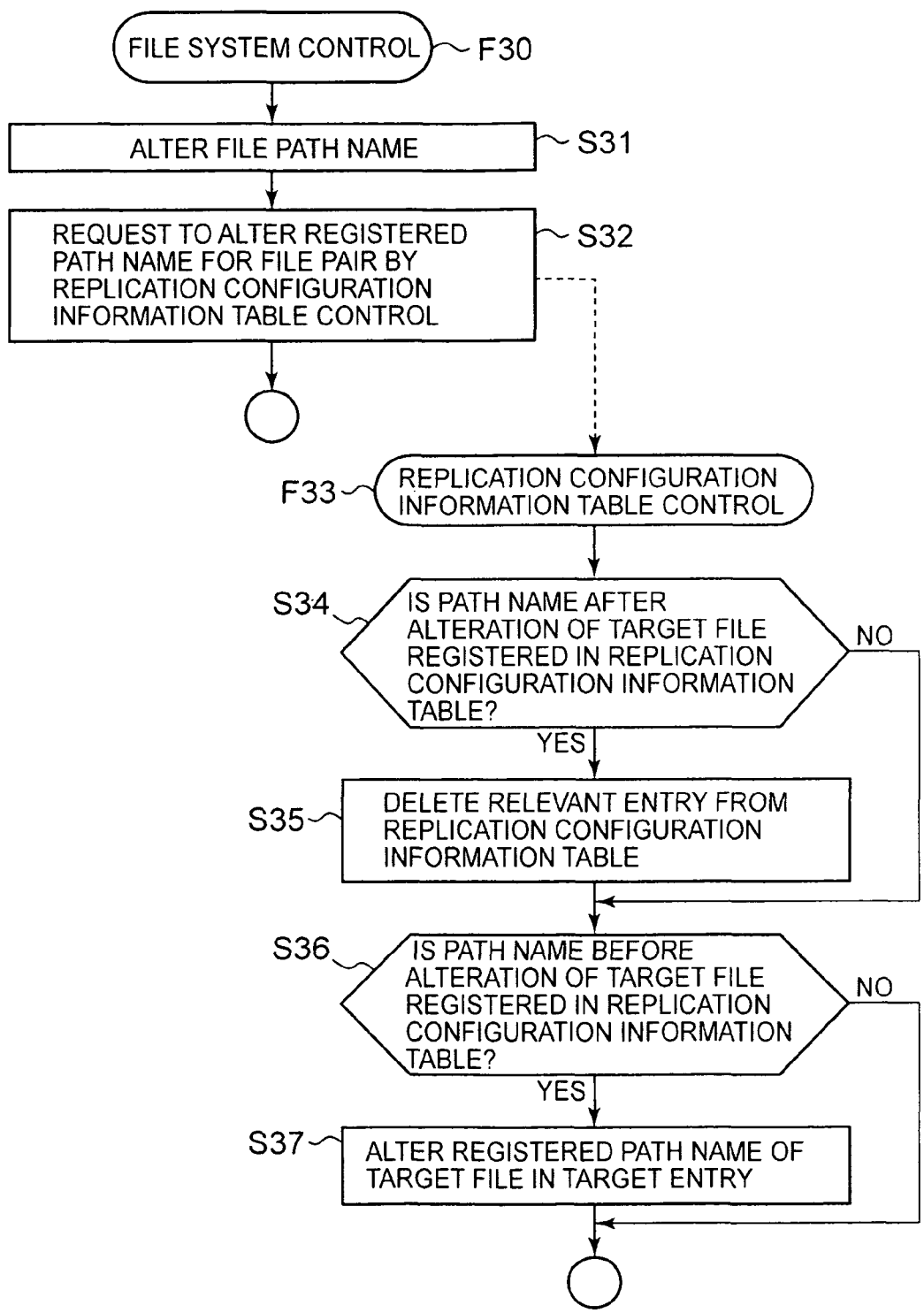
FIG. 8 is a flowchart explaining processing for updating of the replication configuration information table during file migration in Embodiment 1.

FIG. 8 shows the flow of processing to update an entry in the replication configuration information table 127 at the time of file migration.

The reason for updating an entry in the replication configuration information table 127 at the time of file migration is that, when the stored location of either the original file or the clone file is altered due to file migration, a mismatch occurs between the path name registered in the replication configuration information table 127 and the actual path name.

The processing flow F30 represents the flow of file migration processing in the file service control 124 of the file server 100. In the following explanation, the path name of the target file which is the migration source is called the "path name before alteration", and the path name of the migration destination target file is called the "path name after alteration".

First, in order to perform file migration, the path name before alteration of the target file is altered to the path name after alteration (step S31). Specifically, for example, the file service control 124 issues a request to the file system control 123 to alter the path name of the target file. As a result, the file system control 123 alters the path name of the target file. That is, target file migration is performed.

Next, the file service control 124 issues a request to the replication configuration information table control 128 to update the path name before alteration and the path name after alteration if the path name before alteration is registered in the replication configuration information table 127 (step S32). In this processing, the path name before alteration and the path name after alteration of the target file are provided to the replication configuration information table control 128. The specific processing flow is represented by the processing flow F33 in FIG. 8.

The processing flow F33 represents the flow of processing in the replication configuration information table control 128 to update the entry in the replication configuration information table 127.

First, the replication configuration information table control 128 checks whether the path name of the target file after alteration is registered as the path name of an original file or a clone file in the replication configuration information table 127 (step S34). If the path name of the target file after alteration is registered, the replication configuration information table control 128 deletes the entry comprising the path name after alteration from the replication configuration information table 127 (step S35). This is in order to recognize that the originally registered file has been updated.

If on the other hand the path name of the target file after alteration is not registered, step S35 is skipped.

Next, the replication configuration information table control 128 checks whether the path name of the target file before alteration is registered as the path name of an original file or a clone file in the replication configuration information table 127 (step S36). If the path name of the target file before alteration is registered, the replication configuration information table control 128 updates the path name before alteration to the path name after alteration (step S37). If on the other hand the path name of the target file before alteration is not registered, processing ends.

The control to execute the processing flow F30 is not limited to the file service control 124. Processing may be performed by the network file service control 125 of the file server 100, or by the network file service client control 325 of the client machine 300.

Figure 9:
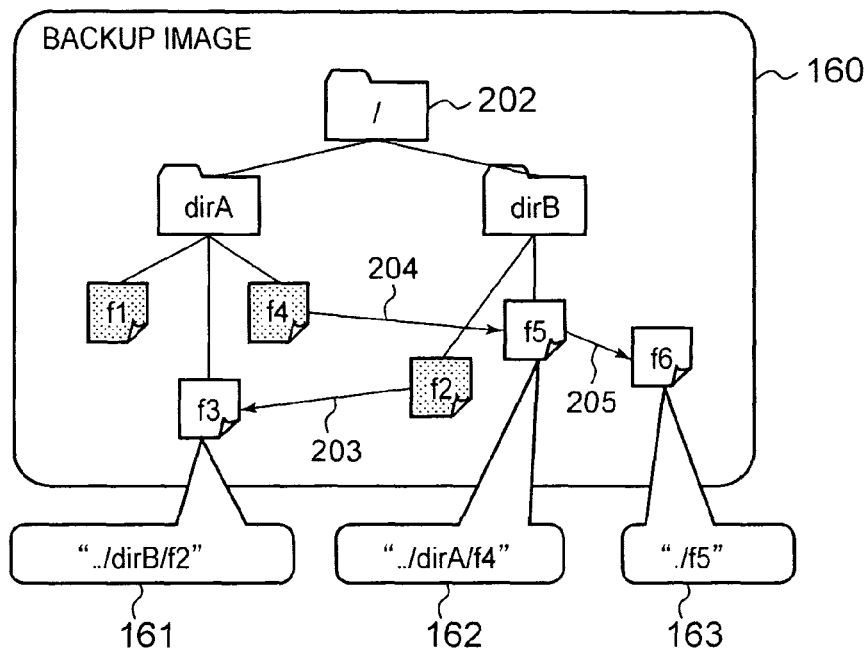
FIG. 9 is an explanatory diagram showing an example of a backup image in Embodiment 1.

FIG. 9 is a conceptual diagram showing an example of a case in which the file server 100 uses the replication configuration information table 127 to create a backup image 160 of the file system 200. FIG. 9 shows the manner of backup image creation in the case in which the entire file system 200 is specified as the backup target, with the root directory 202 of the file system 200, configured as explained in FIG. 4, as the base point.

In Embodiment 1, when generating a backup image of the target backup region, those files among the file group belonging to the backup region the path names of which are registered as clone files in the replication configuration information table 127 are replaced with relative path name stub files of the original files. In this replacement with stub files, Embodiment 1 utilizes a technique called "symbolic linking" which is widely supported in file systems.

Specifically, for example in FIG. 9 the clone file f3 is replaced with a stub file having symbolic link information ("../dirB/f2") 161 to the original file f2. Similarly, the clone file f5 is replaced with a stub file having symbolic link information ("../dirA/f4") 162 to the original file f4, and the clone file f6 is replaced with a stub file having symbolic link information ("./f5") 163 to the original file f5. Through this replacement with stub files, the size of the clone files comprised by the backup image can be reduced, and so the backup image size (that is, the backup volume) can be made smaller. The above processing can be performed by backup restore control 129.

Here, the ".." which appears in symbolic link information within stub files refers to the directory one hierarchical level above its own (the stub file's own) directory level. Further, the "." which appears in symbolic link information refers to the same directory as the file itself. For example, when interpreting symbolic link information 161 from stub file f3, the initial ".." refers to the root directory ("/") 202, which is the directory one level above the directory "/dirA" in which file f3 exists. Further, when interpreting the symbolic link information 163 from file f6, the initial "." refers to "/dirB" in which the file f6 exists.

Figure 10:
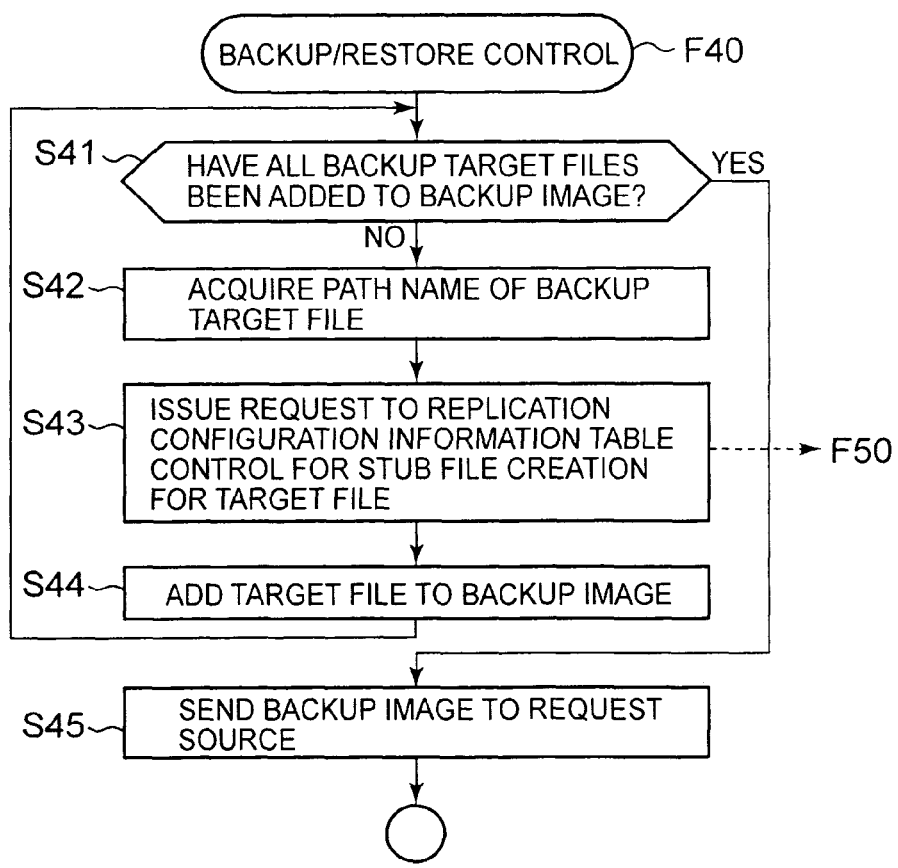
FIG. 10 is a flowchart explaining backup image creation processing in Embodiment 1.

The processing flow F40 of FIG. 10 represents processing flow in the backup/restore control 129 of the file server 100 to create a backup image 160 of the file system 200.

For example, the backup/restore control 129 receives a specification of the directory to service as the base point for the backup (for example, the specification is received from the backup server 400). The backup/restore control 129 creates, in a storage area (for example, in a work area, not shown, provided in memory 120), a backup image 160 comprising the files, directories and similar stored in the hierarchical structure of the file system below the specified directory.

In the processing flow F40, first the backup/restore control 129 checks whether all files of the backup target have been appended to the archive image (backup image 160) (step S41). If appending has not ended, processing proceeds to step S42, explained next. If all files have been appended, processing proceeds to step S45, explained below.

In the next step, the backup/restore control 129 acquires the path name of a backup target file from the file system control 123 (step S42). Here, backup target files can be selected by comprehensively searching in order the target region from the directory which is the base point of the backup. For example, the level of a target directory is checked, and when there are files, the files are selected in order. When there are directories, similar search processing is performed recursively taking the directory as the base point. By this means, the backup target region can be comprehensively searched. Of course, if comprehensive searching is possible, methods other than that of the example may be used.

Next, the backup/restore control 129 issues a request to the replication configuration information table control 128 to create a target file stub for the acquired backup target file (step S43). By means of this processing, a stub file is created for a file which can be replaced by a stub file. The flow of processing at the request destination is explained below as processing flow F50. As a result of this processing, files which were originally stored in the file system 200 are not themselves replaced with stub files. That is, replacement is performed only when appending to a backup image, and files stored in the file system 200 are not themselves replaced. Of course, modifications may be made so that such replacements are performed.

Next, the backup/restore control 129 includes the target file in the backup image (step S44). In the processing of the previous step S43, if a stub file was created, the stub file is included in the backup image. If a stub file was not created, the specified normal file is included in the backup image.

When the processing of step S44 ends, the backup/restore control 129 again returns to step S41. The above processing is repeated until all backup target files have been included in the backup image. When all backup target files have been included in the backup image, the backup image is sent to the request source (step S45). In the case of the system configuration of FIG. 4, the backup image creation request is issued by the backup server 400 to the backup/restore control 129 of the file server 100. Hence in this case, the backup image created in step S45 is sent to the backup server 400 which is the request source.

Figure 11:
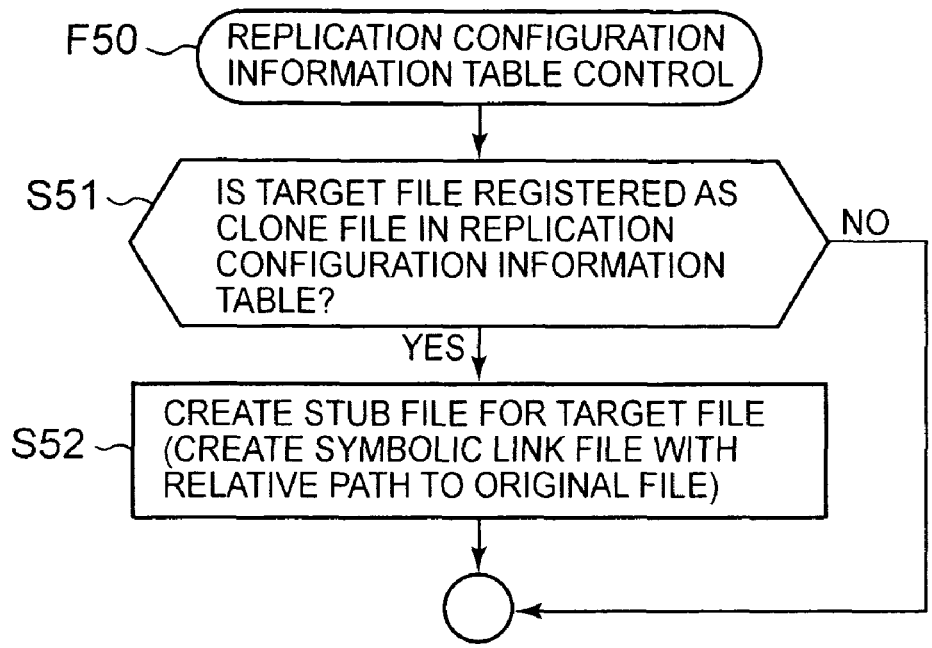
FIG. 11 is a flowchart explaining processing to create a stub file of a clone file during backup image creation processing in Embodiment 1.

The processing flow F50 in FIG. 11 represents the flow of processing in the replication configuration information table control 128 to create a specified stub file. This processing is called from step S43 in the above-described FIG. 10.

Here, the replication configuration information table control 128 first checks whether the specified target file is registered as a clone file in the replication configuration information table 127 (step S51). If the file is not registered as a clone file, a stub file is not created, and processing ends. If the file is registered as a clone file, the replication configuration information table control 128 creates a stub file for the target file (step S52). Here, a symbolic logic file is created having, as symbolic logic information, the relative path name of the original file, based on the file path information registered as the original file in the entry in the replication configuration information table 127. The newly created symbolic logic file is called and passed to the source as a stub file, and the processing ends.

Figure 12:
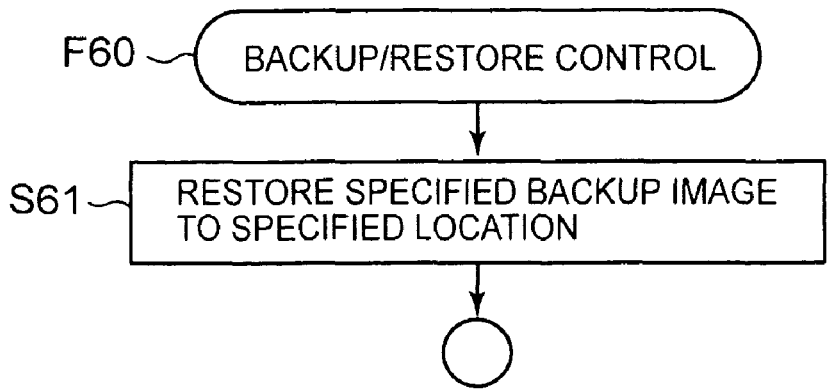
FIG. 12 is a flowchart explaining restore processing in Embodiment 1.

The processing flow F60 of FIG. 12 represents the processing flow, in the backup/restore control 129 of the file server 100, to restore the specified backup image 160 to a directory specified arbitrarily in the file system 200.

For example, at the time of restore the backup server 400 specifies for the backup/restore control 129 the backup image 160 to restore and the directory which is to be the restore destination. The backup/restore control 129 expands and restores the specified backup image below the specified directory (step S61). After restoration by this processing, the user can access the restored files. When an accessed file is a stub file, by interpreting the stub file as a symbolic link file, the original file having the same contents as the file in question can be accessed.

In the above, Embodiment 1 of the invention has been explained; however, this invention is not limited to Embodiment 1, and of course various configurations can be employed within the range in which there is no deviation from the gist of the invention. For example, Embodiment 2, Embodiment 3, and Embodiment 4, described below, are possible.

Embodiment 2

The above-described Embodiment 1 explains a configuration in which the file server 100 has one file system 200, as shown in the system configuration diagram of FIG. 4; but other configurations are possible. The file server 100 may have a plurality of file systems.

Figure 13:
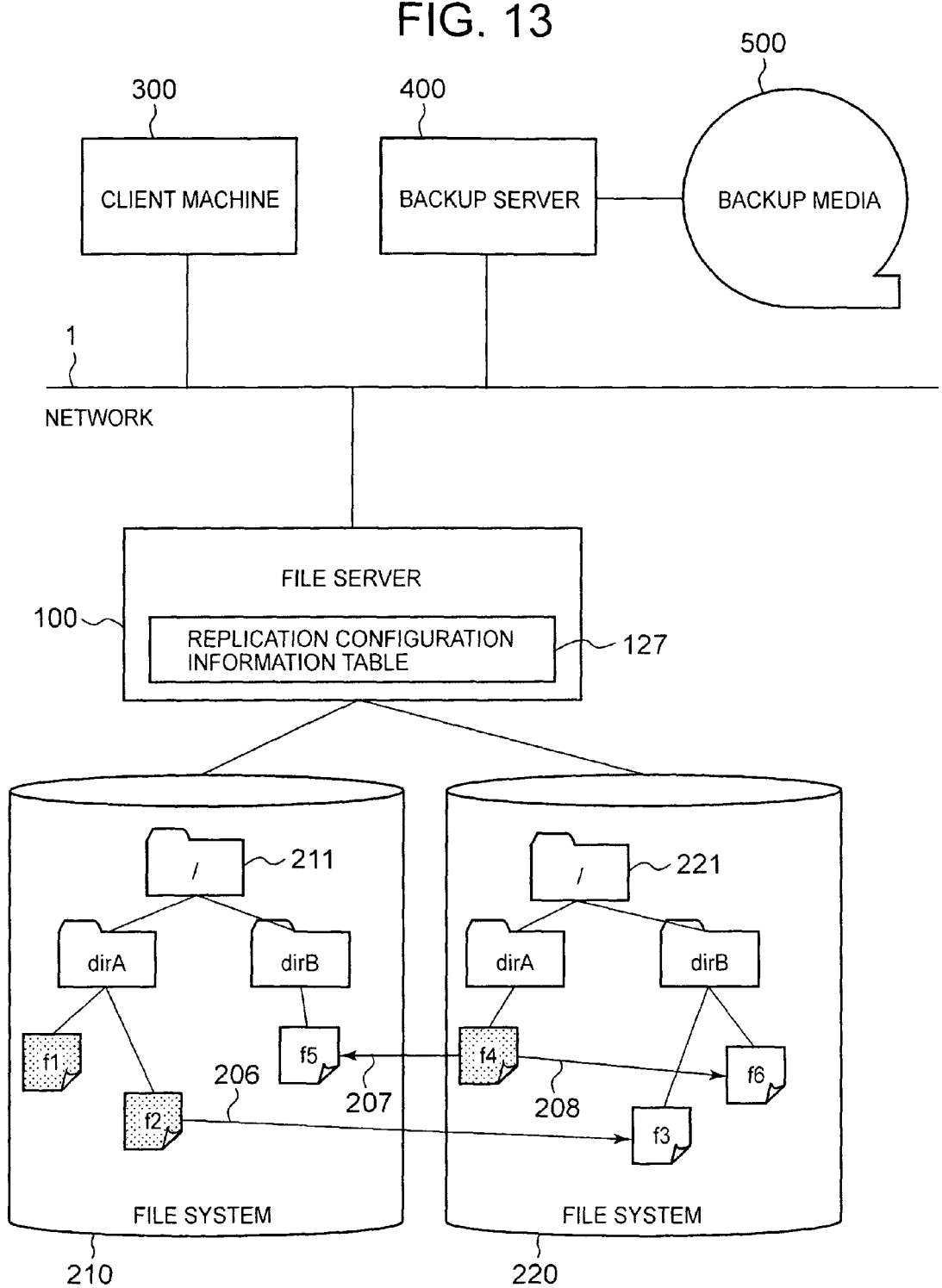
FIG. 13 shows the system configuration during operation of a plurality of file systems in Embodiment 2.

FIG. 13 is an explanatory diagram showing an example of a system configuration in which the file server 100 has a plurality of file systems.

The file server 100 providing file services has two file systems, 210 and 220.

In one of the file systems, 210, data is managed in a hierarchical structure in which the root directory ("/") 211 of the file system is the apex. In FIG. 13, there exist two directories, dirA and dirB, below the root directory 211. Below directory dirA there exist two files, f1 and f2. Below directory dirB there exists a single file f5.

In the other file system 220, data is managed in a hierarchical structure in which the root directory ("/") 221 of the file system is the apex. In FIG. 13, below the root directory 221 there exist two directories, dirA and dirB. Below directory dirA there exists one file f4. Below directory dirB there exist two files, f3 and f6.

The arrows 206, 207 and 208 in FIG. 13 represent replication of files in the file systems 210 and 220 utilizing functions of the file service control 124 provided by the file server 100. The arrow 206 indicates replication of the file f2 in file system 210 to create the file f3 in file system 220. Similarly, the arrow 207 indicates replication of the file f4 to create the file f5, and the arrow 205 indicates replication of the file f4 to create the file f6. Otherwise the configuration is the same as in FIG. 4.

Figures 14, 15:
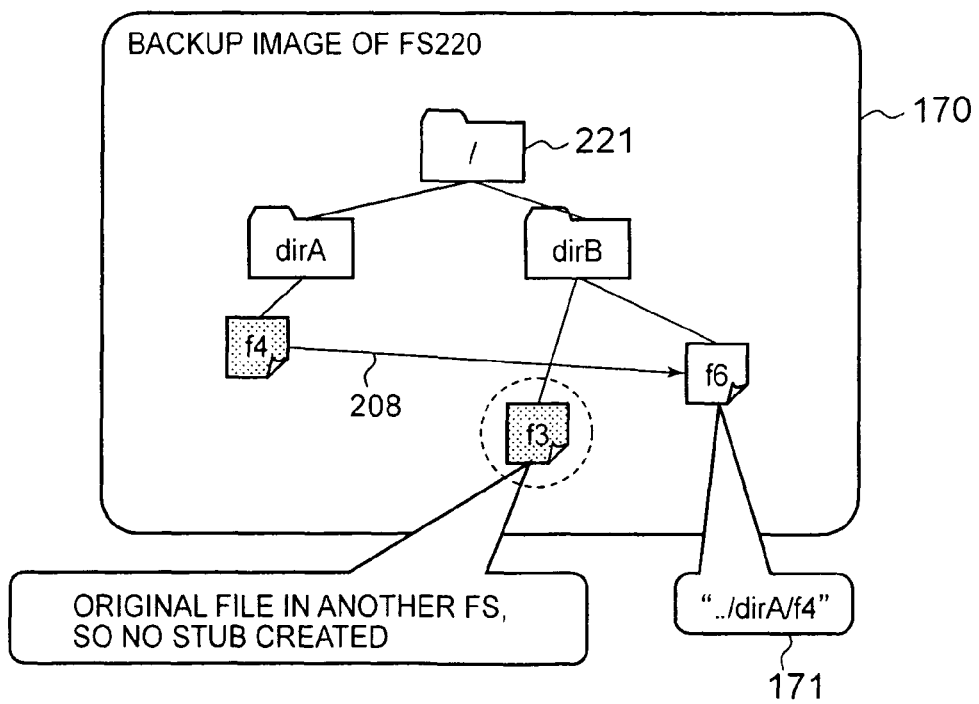
FIG. 14 is an explanatory diagram showing an example of a replication configuration information table in Embodiment 2.
FIG. 15 is an explanatory diagram showing an example of a backup image in Embodiment 2.

FIG. 14 shows an example of the configuration of a replication configuration information table 127 in Embodiment 2.

In the replication configuration information table 127, a correspondence relation between an original file and a clone file in the file systems 210 and 220 managed by the file server 100 is managed as a single entry. Here, as a correspondence relation, stored locations of the two files in the file systems 210 and 220 are managed. In FIG. 14, file system identification information and the path names of the files in the file systems are managed as the stored locations. By this means, a plurality of file systems can be accommodated. The file path names are the same as in FIG. 5. For example, in a correspondence relation between the original file f2 and the clone file f3 in FIG. 14, a single entry is managed in which "FS210:/dirA/f2" is the stored location of the original file, and "FS220:/dirB/f3" is the stored location of the clone file. Here, a delimiting character is added between the file system identifying number and the path name. In FIG. 14, ":" is used. Of course, other delimiting characters may be used. Other than the above, particulars are the same as shown in FIG. 5.

FIG. 15 is a conceptual diagram showing an example of a case in which the replication configuration information table 127 is used to create a backup image 170 of the file system 220, when the file server 100 manages the file systems 210 and 220. FIG. 15 shows the manner in which a backup image is created when the entire file system 220 is specified as the backup target, with the root directory 221 of the file system 220, having the configuration explained in FIG. 13, as the base point.

In Embodiment 2, as explained in Embodiment 1, a file registered as a clone file in the replication configuration information table 127 is replaced with a stub file, which is a symbolic link file having the relative path name of the original file. However, when the original file is not included in the backup target, this replacement with a stub file is not performed. The reason for this is that, when restoring data using the backup image, if the original file is not included in the backup image, even when the clone file is replaced with a stub file, the original file may not necessarily exist at the symbolic link destination from the stub file. For example, in FIG. 15 the clone file f3 would ordinarily be replaced with a stub file having symbolic link information to the original file f2. However, it is seen that the file f2 is managed in the file system 210, which is not included in the backup target. Hence for the reason explained above, this file f3 is not replaced with a stub file. On the other hand, the contents of the clone file f6 are replaced with symbolic link information ("../dirA/f4") 171 to the original file f4. By this means, when restoring the backup image, it is possible to prevent in advance a situation in which the symbolic link file alone is restored, while the original file corresponding thereto does not exist.

Figure 16:
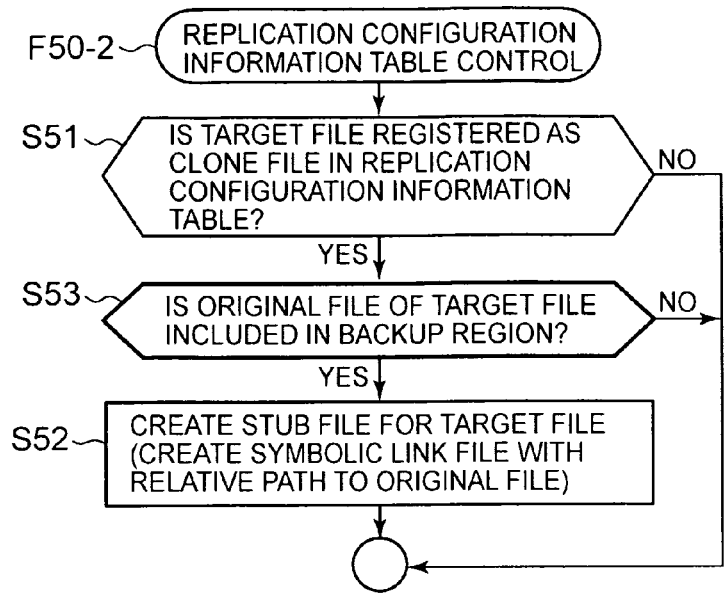
FIG. 16 is a flowchart explaining processing to create a stub file of a clone file during backup image creation processing in Embodiment 2.

The processing flow F50-2 in FIG. 16 is the processing flow F50 shown in FIG. 11, expanded to accommodate cases such as that described above in which a stub file is not created.

In the processing flow F50-2, compared with the processing flow F50, processing step S53 is added between processing step S51 and processing step S52. In the added processing step S53, a check is performed to determine whether the original file of a target file (that is, a clone file which is a backup target) is included in the backup region. The stored location of the original file is acquired as the path name corresponding to the path name of the target file from the replication configuration information table 127, and by analyzing the path name the check is performed. In order to check whether the original file is included in the backup target, in this processing it is necessary to pass, from the calling source, directory information for the directory which is the base point at the time of creation of the backup image, such that the relevant backup region information is known. In this processing flow, a check is performed as to whether the original file of the target file is included in the backup target based on the backup base point directory information (for example, directory name and file system identifying number) which is passed. If the information is included, then processing advances to processing step S52 to create a stub file. If not included, processing ends.

In Embodiment 2, when restoring from a backup image, restore may be performed using the same method as the method in Embodiment 1.

In the above-described Embodiment 2, a case in which a plurality of file systems are used in file management was taken as an example to explain a case in which a file server 100 manages two file systems 210 and 220; but the number of file systems is not limited to two. When managing this many or more file systems, the present method can be applied. Also, the method explained in Embodiment 2 can also be applied when backing up only a portion of one file system.

Embodiment 3

The above-described Embodiment 1 was explained in a configuration with a single file server 100, as shown in the system configuration of FIG. 4; but other configurations are possible. A configuration in which a plurality of file servers exist may be used.

Figure 17:
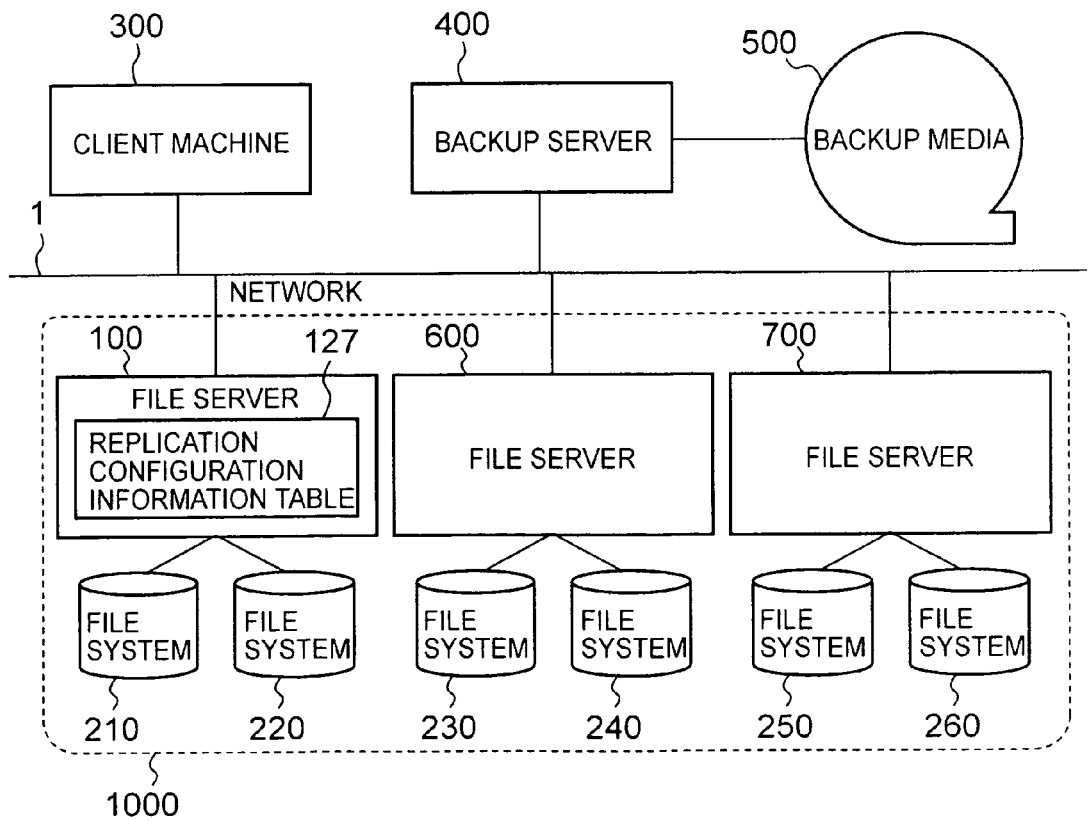
FIG. 17 shows the system configuration during operation of a plurality of file servers in Embodiment 3.

FIG. 17 is an explanatory diagram showing an example of a system configuration in which a plurality of file servers exist.

In FIG. 17, there exist three file servers 100, 600 and 700, which provide file services, having their respective file systems, and providing file services. Further, the file servers provide a global name space 1000 (integrated file server system) to provide integrated file services. The file servers forming the global name space 1000 may mediate access requests from the client machine 300 to other file servers comprised by the global name space 1000.

In FIG. 17, the file server 100 has the file systems 210 and 220; the file server 600 has the file systems 230 and 240; and the file server 700 has the file systems 250 and 260. The file server 100, as the representative server, has a replication configuration information table 127. Other than not having a replication configuration information table 127, the other file servers 600 and 700 have the same configuration as the file server 100. Other than the above particulars, the configuration is the same as in FIG. 4 and FIG. 13.

In order to implement the method described in Embodiments 1 and 2, when in the environment shown in FIG. 17 there is file replication, updating and migration in the file servers 600 and 700, the representative server 100 having the replication configuration information table 127 is notified of this fact, and the replication configuration information table 127 must be updated.

Figure 18:
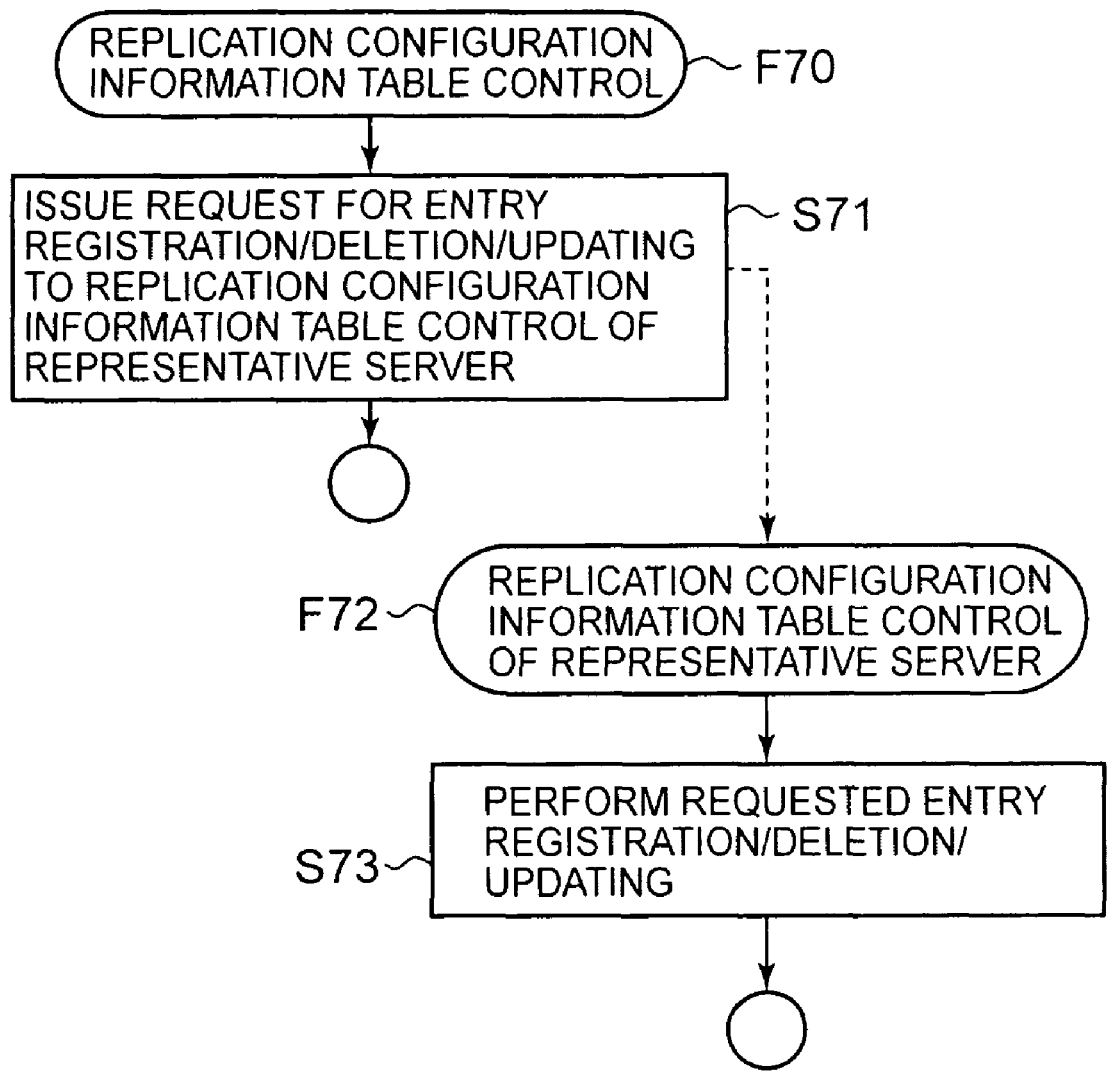
FIG. 18 is a flowchart explaining processing to update the replication configuration information table in Embodiment 3.

FIG. 18 shows the processing flow F70, which is the flow of communication processing to update the replication configuration information table 127.

This processing flow F70 is executed in a file server in which no replication configuration information table 127 exists when an operation of file replication, updating, or migration is performed, as shown in FIG. 6, FIG. 7 and FIG. 8. The occasion of this execution is a request by the file service control 124 to the replication configuration information table control 128 to access the replication configuration information table 127. Specifically, in the file servers 600 and 700, in place of the processing flow F13 in FIG. 6, the processing flow F23 in FIG. 7 and the processing flow F33 in FIG. 8, the processing flow F70 is executed.

In the processing flow F70, the replication configuration information table control 128 of the file server which is the representative server is requested to register, delete, or update an entry with processing contents received from the request source (step S71). Upon receiving this request, the replication configuration information table control 128 of the file server which is the representative server executes the processing flow F72 explained next. In the processing flow F72, registration, deletion, or updating of the requested entry in the replication configuration information table 127 is performed, based on the processing contents received from the request source (step S73). The specific flow of entry registration processing is the same as in the processing flow F13 of FIG. 6; the entry deletion processing flow is the same as in the processing flow F23 of FIG. 7; and the entry updating flow is the same as in the processing flow F33 of FIG. 8.

In the environment in which the plurality of file servers exist in Embodiment 3, backups and restores are executed using the same method as explained in Embodiment 2. However, replacement of clone files with stub files can be performed only when a backup image is created by the file server 100 which is the representative file server. Files comprised by a backup image may be files in the file systems 230, 240, 250, or 260 managed by the other file servers 600 and 700, in place of or in addition to files in the file systems 210 and 220 managed by the representative server 100. In this case also, the replication configuration information table 127 can be used to replace clone files with stub files. On the other hand, when creating a backup image using another file server 600 or 700, the information of the replication configuration information table 127 is not present, and so clone files cannot be replaced with stub files, and only an ordinary backup image can be created.

In the above-described Embodiment 3, a case in which there are three file servers 100, 600 and 700 was explained as an example of accommodation of a plurality of file servers; but other numbers of file servers can be accommodated. This method can be applied even when there are two file servers, or when there exist a greater number of file servers.

Embodiment 4

The above-described Embodiment 3 was explained for a configuration in which, as shown in the system configuration diagram of FIG. 17, a plurality of file servers exist, and moreover a file server having a replication configuration information table 127 is a representative server; however, other configurations are possible. A configuration is also possible in which replication configuration information tables exist in each of the file servers.

Figure 19:
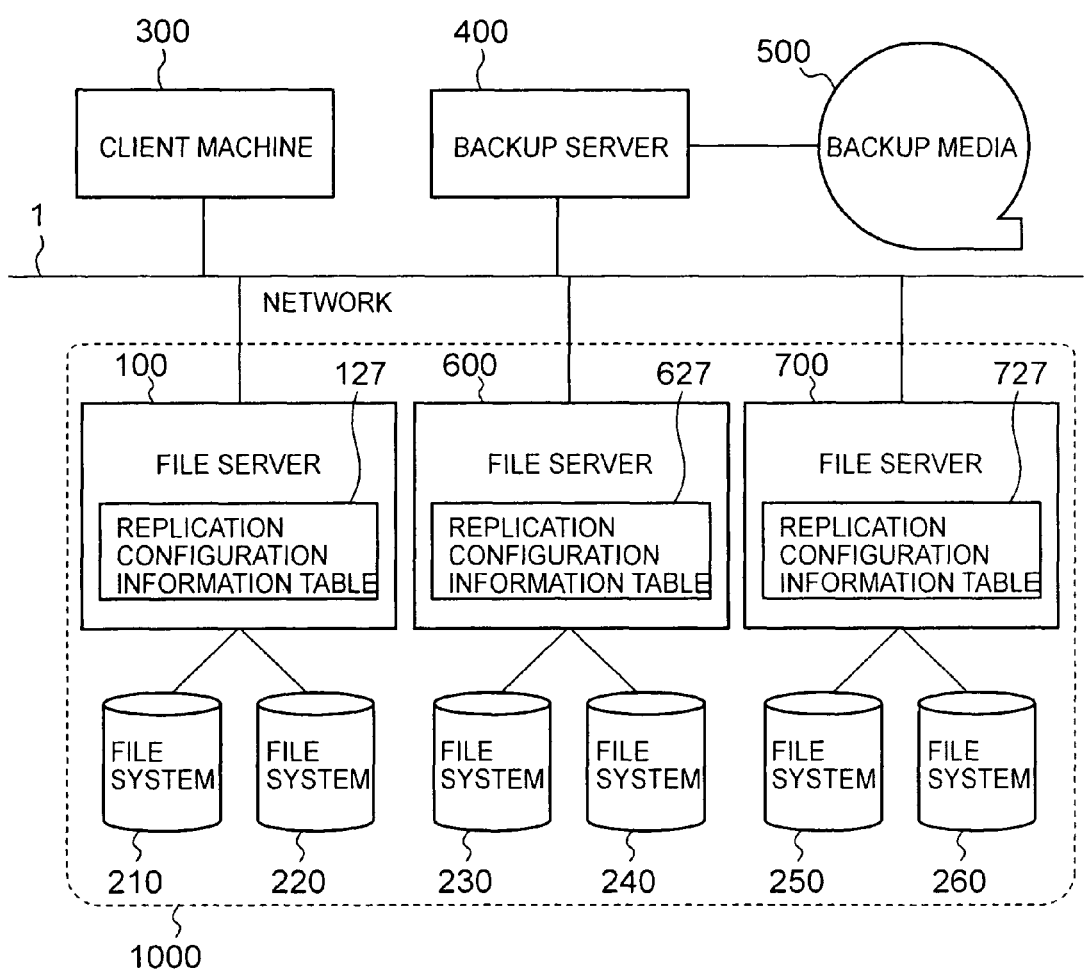
FIG. 19 shows the system configuration during operation of a plurality of file servers in Embodiment 4.

FIG. 19 is an explanatory diagram showing an example of a system configuration for the case in which a replication configuration information table exists in each of the file servers.

In FIG. 19, similarly to FIG. 17, there exist three file servers 100, 600 and 700 which provide file services; each has file systems and provides file services. Further, each file server may provide a global name space 1000 to provide integrated file services. A file server forming a global name space 1000 may mediate requests from the client machine 300 to access other file servers forming the global name space 1000. A point of difference with FIG. 17 is the fact that in the file servers 600 and 700, the replication configuration information tables 627 and 628 are respectively managed. The contents of these replication configuration information tables 127, 627 and 727 are assumed to be synchronized over the range of the global name space 1000. Other than the above, particulars are the same as shown in FIG. 4 and FIG. 13.

In order to realize the methods described in Embodiment 1 and Embodiment 2 in the environment shown in FIG. 19, when there is replication, updating, or migration of a file by a file server, after reflecting this fact in the replication configuration information table managed by the file server itself, the relevant information must be synchronized with the replication configuration information tables managed by other file servers forming the global name space 1000.

Figure 20:
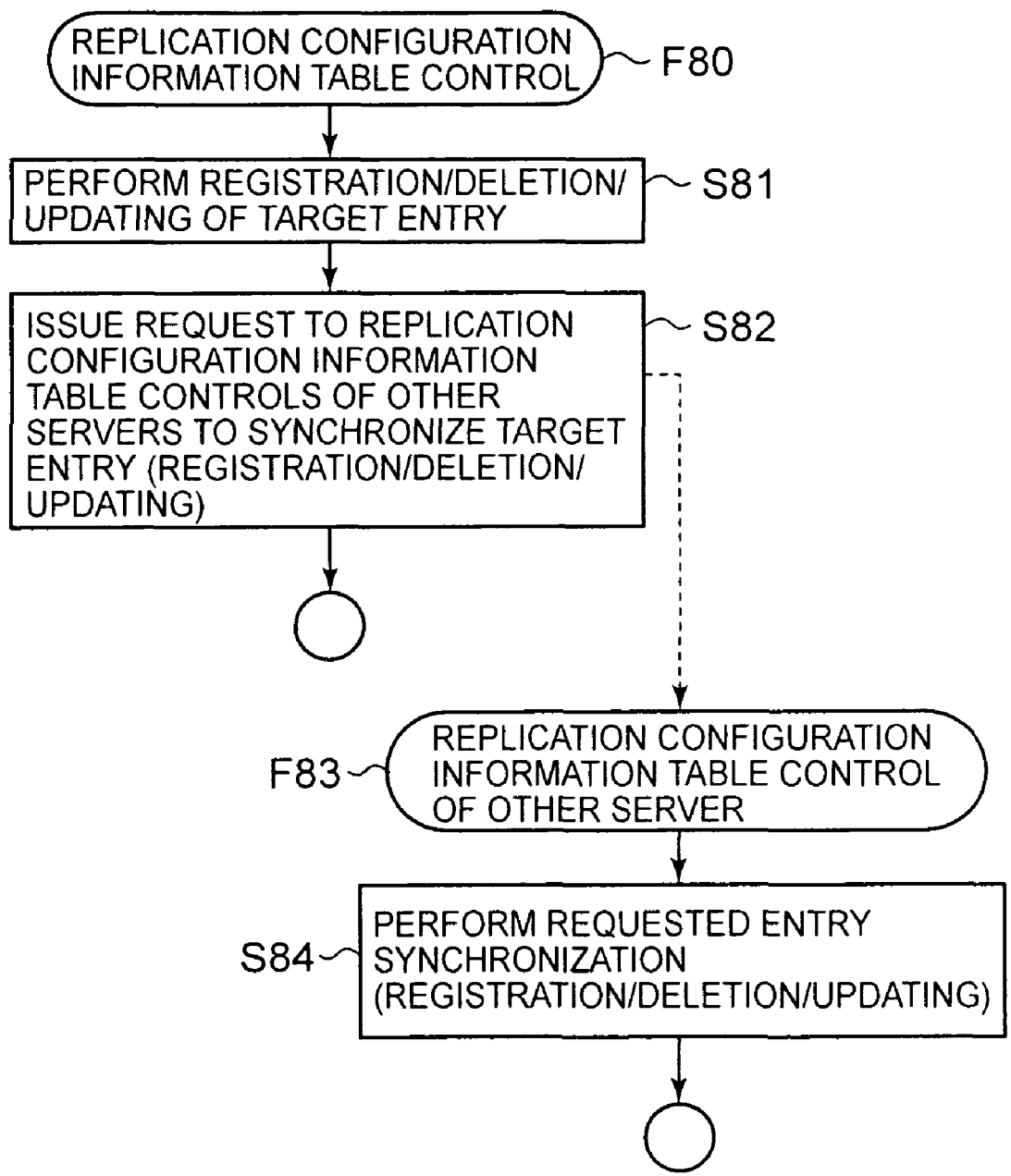
FIG. 20 is a flowchart explaining processing to synchronize the replication configuration information table in Embodiment 4.

FIG. 20 shows the processing flow F80, which is the flow of processing for communication and synchronization of replication configuration information tables.

This processing flow F80 is executed by the file server's operations of file replication, updating, and migration, as shown in FIG. 6, FIG. 7 and FIG. 8. The occasion for this execution is the issuing of a request, from the file service control 124 to the replication configuration information table control 128, to access the replication configuration information table 127. Specifically, in the file server, the processing flow F80 is executed instead of executing the processing flow F13 in FIG. 6, the processing flow F23 in FIG. 7, or the processing flow F33 in FIG. 8.

In the processing flow F80, registration, deletion, or updating of the entry in question in the replication configuration information table of the file server itself is performed, based on the processing contents received from the request source (step S81). The specific flow of entry registration processing is the same as in the processing flow F13 of FIG. 6; the entry deletion processing flow is the same as in the processing flow F23 of FIG. 7; and the entry updating flow is the same as in the processing flow F33 of FIG. 8. Next, a request for synchronization of the entry in question is issued to the other file servers forming the global name space 1000 (step S82). In the replication configuration information table control of the file server issuing the request, the processing flow F83, explained next, is executed.

In the processing flow F83, the requested entry synchronization in the replication configuration information table 127 is performed based on the processing contents received from the request source (step S84). In this synchronization processing, registration, deletion, or updating of the relevant entry is performed. The specific flow of entry registration processing is the same as in the processing flow F13 of FIG. 6; the entry deletion processing flow is the same as in the processing flow F23 of FIG. 7; and the entry updating flow is the same as in the processing flow F33 of FIG. 8.

In an environment such as that of Embodiment 4 in which there exist a plurality of file servers, and each file server has a replication configuration information table, backups and restores are executed by the same method as that explained in Embodiment 2. In Embodiment 4, in contrast with Embodiment 3, clone files can be replaced with stub files when a backup image is created by any file server forming the global name space 1000.

In the above-described Embodiment 4, a case in which there are three file servers, 100, 600 and 700, was explained as the plurality of file servers accommodated; but the number of file servers may be other than this. This method can be employed when there are two file servers, or when there exist a greater number of file servers.

In the above, a number of embodiments of the invention were explained; but these embodiments are merely illustrations for purposes of explaining the invention, and the scope of the invention is not limited to these embodiments. The invention can be implemented in a variety of other modes without deviating from the gist thereof. For example, in the above-described embodiments, clone files were replaced with stub files using symbolic links; but other types of file-sharing techniques may be used. Specifically, the technique known simply as "links" in UNIX (a registered trademark) may be used. Specifically, by for example associating a first file name and a second file name in a single file, the two files may effectively be condensed into a single file.

What is claimed is:

1. A storage system comprising:
    a computer readable storage medium storing a first file system including a first original file, a first clone file and a second clone file, a second file system including a second original file, the first clone file which is a replication file of the first original file and the second clone file which is a replication file of the second original file; and
    a server coupled to the computer readable storage medium, the server which manages the first file system and the second file system, and has replication information including an indication of relation between a path name of an original file and a path name of a clone file, and
    wherein when the server performs a backup of the first file system:
    the server adds the first original file to a backup image of the first file system,
    the server checks, by referring to the replication information, whether the first original file, that is an original file corresponding to the first clone file included in the first file system, and the second original file, that is an original file corresponding to the second clone file included in the first file system, is included in the first file system which is a backup region,
    the server checks that the first original file is included in the first file system and creates a first stub file which includes a first path name to the first original file and adds the created first stub file to the backup image,
    the server checks that the second original file is included in the second file system which is different from the first file system, and does not create a second stub file which includes a second path name to the second original file, and adds the second clone file to the backup image, and
    the server sends the backup image to a backup computer readable storage medium.

2. The storage system according to the claim 1, wherein the second file is not included in the backup image.

3. The storage system according to the claim 1, wherein the path name includes symbolic link information constituted by a relative path name to the first file from the second file.

4. The storage system according to the claim 1, further comprising:
    another computer readable storage medium storing a second file system including a third file,
    wherein the first file system further includes a fourth file which is a replication file of the third file, and
    wherein when the server creates the backup image, though the server recognizes the fourth file as the replication file of the third file by referring to the replication information, the fourth file is not replaced with a path name to the third file.

5. The storage system according to the claim 1, wherein the first file system further includes:
    a third file,
    wherein when the sever creates a fourth file which is a replication file of the third file, the server adds the third file and the fourth file to the replication information.

6. The storage system according to the claim 1, wherein the server specified a directory which is to be a restore destination, and restores the backup image to the directory.

7. A server coupled to a computer readable storage medium storing a first file system including a first original file, a first clone file and a second clone file, a second file system including a second original file, the first clone file which is a replication file of the first original file and the second clone file which is a replication file of the second original file, the server comprising:
    a processor which manages the first file system and the second file system; and
    a memory storing replication information including indication of relation between a path name of an original file and a path name of a clone file,
    wherein when the backup of the first file system is performed, the processor:
    adds the first original file to a backup image of the first file system, checks, by referring to the replication information, whether the first original file, that is an original file corresponding to the first clone file included in the first file system, and the second original file, that is an original file corresponding to the second clone file included in the first file system, is included in the first file system which is a backup region,
    checks that the first original file is included in the first file system,
    creates a first stub file which includes a first path name to the first original file,
    adds the created first stub file to the backup image,
    checks that the second original file is included in the second file system which is different from the first file system,
    does not create a second stub file which includes a second path name to the second original file,
    adds the second clone file to the backup image, and
    sends the backup image to a backup computer readable storage medium.

8. The server system according to the claim 7, wherein the second file is not included in the backup image.

9. The server according to the claim 8, wherein the path name includes symbolic link information constituted by a relative path name to the first file from the second file.

10. The server according to the claim 8, wherein the server is further coupled to another computer readable storage medium storing a second file system including a third file,
    wherein the first file system further includes a fourth file which is a replication file of the third file, and wherein when the processor creates the backup image, though the processor recognizes the fourth file as a replication file of the third file by referring to the replication information, the fourth file is not replaced with a path name to the third file.

11. The server according to the claim 8, wherein the first file system further includes:

a third file, wherein when the processor creates a fourth file which is a replication file of the third file, the processor adds the third file and the fourth file to the replication information.

12. The storage system according to the claim 8, wherein the processor specifies a directory which is to be a restore destination, and restores the backup image to the directory.

* * * * *